United States Patent [19]
Bell et al.

[11] Patent Number: 5,048,080
[45] Date of Patent: Sep. 10, 1991

[54] CONTROL AND INTERFACE APPARATUS FOR TELEPHONE SYSTEMS

[75] Inventors: John F. Bell, Howell; David F. Jones, Middletown, both of N.J.; Farid Khalili, Great Neck, N.Y.; Walter G. Kutzavitch, Freehold, N.J.; Thong V. Luu, Eatontown, N.J.; Manhar R. Mahida, Princeton Junction, N.J.

[73] Assignee: AT&T Bell Laboratories, Murray Hill, Pa.

[21] Appl. No.: 546,322

[22] Filed: Jun. 29, 1990

[51] Int. Cl.⁵ .................................... H04M 1/72
[52] U.S. Cl. .................................... 379/165; 379/387
[58] Field of Search .................. 379/165, 387, 156

[56] References Cited

U.S. PATENT DOCUMENTS

| | | |
|---|---|---|
| 4,088,846 | 5/1978 | McEowen. |
| 4,216,356 | 8/1980 | Burke et al. |
| 4,220,827 | 9/1980 | Burke et al. |
| 4,292,474 | 9/1981 | Morrell et al. |
| 4,363,936 | 12/1982 | Christain et al. ............... 379/165 |
| 4,454,383 | 6/1984 | Judd. |
| 4,459,434 | 7/1984 | Benning et al. |
| 4,477,697 | 10/1984 | Judd et al. |
| 4,538,031 | 8/1985 | Benning et al. |
| 4,572,928 | 2/1986 | Nishimura et al. ............ 379/165 |
| 4,905,274 | 2/1990 | Cooper et al. ................. 379/165 |

Primary Examiner—Stafford D. Schreyer
Attorney, Agent, or Firm—Thomas Stafford

[57] ABSTRACT

Apparatus is disclosed for incorporation into a key telephone system control unit, in at least one station port, for operating an at least one key type set and an at least one tip and ring device simultaneously bridged onto the same station port without the use of any special service circuits or adaptors. The ability to signal alerting indepenedntly via ringing signal on a TR-pair, via messages indicating alerting transmitted on a service pair for a key set or via both techniques simultaneously is also disclosed. Further, the alerting ability disclosed in combination with control by a key system controller of the access of a key set to voiceband communications over the TR-pair allows for incorporation of additional features into a key telephone system. These features include the following: ring specific applications relating to an external event; direct transfer of calls to the transferor station port; calling other sets on the same station port; MEWPRIC (Multiple Extension With Personal Ringing on Incoming Calls) operation, i.e., a party line type of operation where the TR device and the key set sharing a single station port of station ports 103 are assigned different endpoint addresses; prevention of "barge in", i.e., bridging, by a key type set onto a call to a TR device; time phasing of rings to allow for a coverage operation; and fax trouble detection.

23 Claims, 9 Drawing Sheets

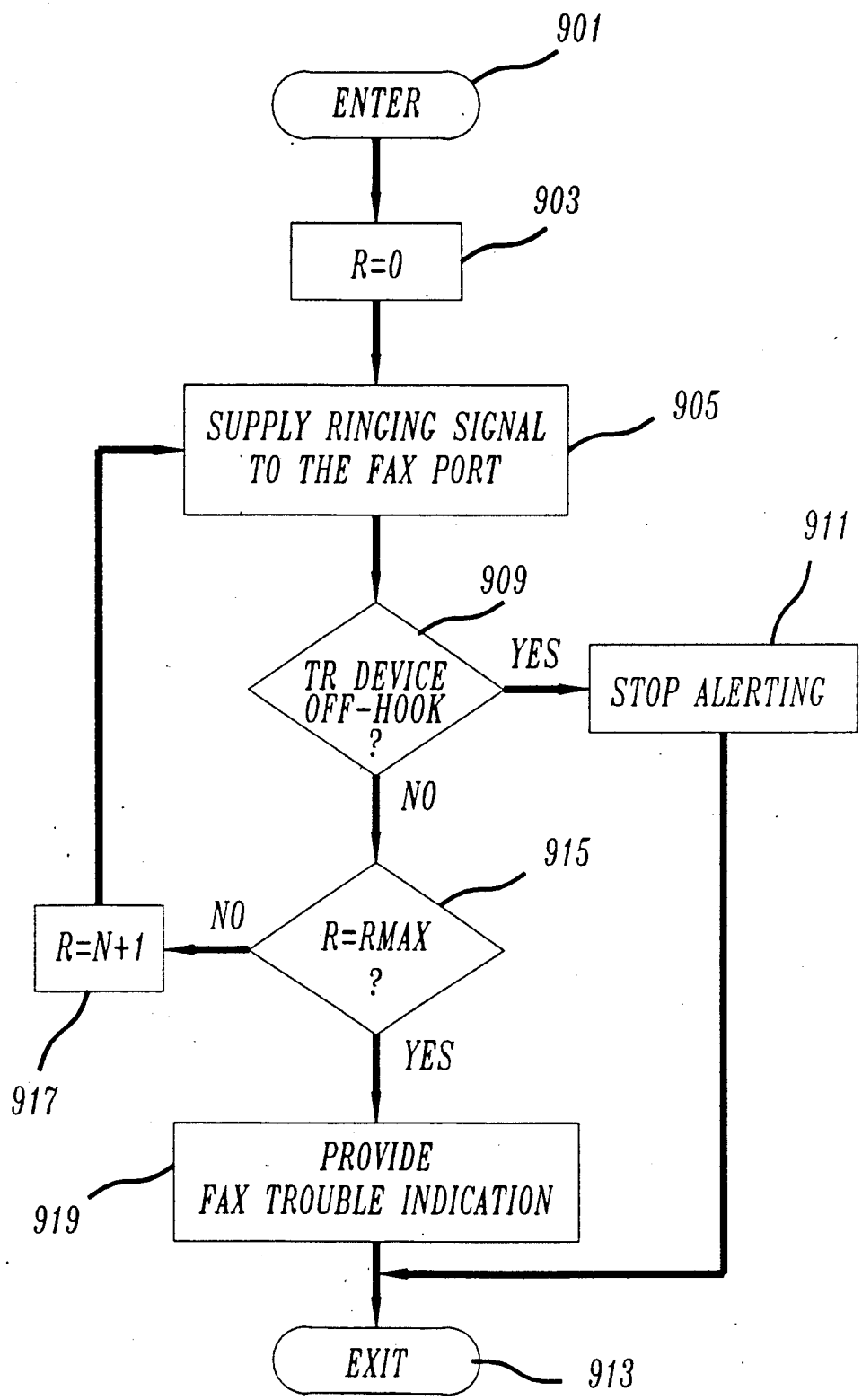

CONTROL AND INTERFACE APPARATUS FOR TELEPHONE SYSTEMS

CROSS-REFERENCE TO RELATED APPLICATION

U.S. patent application Ser. No. 546,323 was filed concurrently herewith.

TECHNICAL FIELD

This invention relates to telephone switching systems and, more particularly, to interfacing telephone switching control units to various configurations of associated station sets at a station port.

BACKGROUND OF THE INVENTION

Prior telephone switching control units, e.g., key telephone system controllers or private branch exchanges (PBXs), are not fully compatible with a configuration in which both so-called tip and ring devices (TR devices) available today and enhanced functionality or key type station sets (key sets) are bridged simultaneously to an individual interface port. In the context of this application the terms key sets and TR devices or sets are used in accordance with the modern understanding of these terms in the art. Accordingly, key sets are meant to be multifunction telephone station sets or station equipment type adjuncts that utilize special digital messaging protocols to communicate with the control unit concerning actions taken at the set and/or actions that the set should take. TR devices are the well known tip and ring devices including, without limitation: standard, home-use type telephone sets—both rotary and multi-frequency signaling types; answering machines; facsimile (FAX) machines; and modems. The incompatibility results from the difference in nature and format between the information required to support the functionality of a key set and the information required to support the functionality of a TR device. To allow the use of both key sets and TR devices with the same control unit in a key telephone system some implementations utilize one set of interface boards to connect to TR devices and another set of interface boards to connect to key sets. Alternative implementations provide an interface only for key type sets and require expensive adaptors to utilize lower cost commercially available tip and ring devices. Prior systems lacked the ability to alert and control TR devices and a key set independently at any port or simultaneously bridged onto the same port. Consequently, the features and call coverage options available to users of these priors system was limited. This increased the cost of these prior systems while limiting their usefulness.

One commercially available series of telephone systems will accept both key telephone sets and TR sets in a bridged configuration to a single port despite their incompatibility. In a such a configuration, however, only the key set is fully operated by the control unit. The TR device is not alerted by the control unit. Further, a TR device bridged in such a configuration can neither place calls nor operate features. Additionally, no method of controlling access to the voiceband communication medium shared by the bridged key set and TR device is provided. Accordingly, this system has noticeable drawbacks in many typical situations. For example, providing coverage with an answering machine of calls that are routed to a particular port requiring an enhanced functionality telephone necessitates either the use of an additional port or a special adaptor. Similarly, the use of a modem bridged with a key set would require placing the call by manual dialing from a key set. Also, a potential exists in such a configuration that data being supplied to or from the modem could be corrupted by voice information being transmitted from the key set. Also, this prior system does not recognize pulse (rotary) type dialing from a TR device in any configuration.

SUMMARY OF THE INVENTION

The problems and limitations with prior key telephone system units are overcome, in accordance with an aspect of the invention, by advantageously including unique apparatus in at least one station port of a key telephone system control unit for operating at least one key type set and at least one tip and ring device simultaneously bridged onto the same station port without the use of any special external service circuits or adaptors. Further, this unique apparatus permits either an at least one key set or an at least one tip and ring device connected to the station port to be operated without requiring the other category of set to be bridged on as well. In a departure from the prior art, our unique key telephone system control unit includes apparatus for determining whether to ring only the tip and ring devices bridged on a station port, only the key type sets bridged on a station port or both the tip and ring devices and key type sets bridged on a station port simultaneously. The apparatus can therefore provide previously unavailable features to a user. These features include the following: ring specific applications relating to an external event; direct transfer of calls to the transferor station port; calling other sets on the same station port; MEWPRIC (Multiple Extension With Personal Ringing on Incoming Calls) operation, i.e., a party line type of operation where the TR device and the key set sharing a single station port are assigned different endpoint addresses; prevention of "barge in", i.e., bridging, by a key type set onto a call to a TR device; time phasing of rings to allow for a coverage operation; and FAX trouble indication.

In an exemplary implementation, the station port includes apparatus for supplying tip and ring loop power and for controllably applying tip and ring ringing voltage (ringing signal) to a first pair of conductors, the TR-pair. Additionally, a transceiver adapted for transmitting and receiving voice band information over the first pair of conductors and a sensor for detecting the drawing of at least a predetermined amount of loop current from the first conductor pair is incorporated into the control unit station port interface. The station port interface further includes apparatus adapted for bi-directionally communicating supervisory and control signals over a second pair of conductors, the service pair. Operating power intended for key sets, in a preferred embodiment, is also provided on the second pair. Therefore, a key system controller employing such a station port interface is capable of interfacing with and fully operating at least one compatible key telephone set, at least one tip and ring device or at least a key type set and at least one tip and ring device simultaneously bridged onto the same station port without the use of any special service circuits or adaptors.

BRIEF DESCRIPTION OF THE DRAWING

In the Drawing:

FIG. 9 shows an exemplary implementation, in flow chart form, of FAX trouble indication.

DETAILED DESCRIPTION

Figure 1:
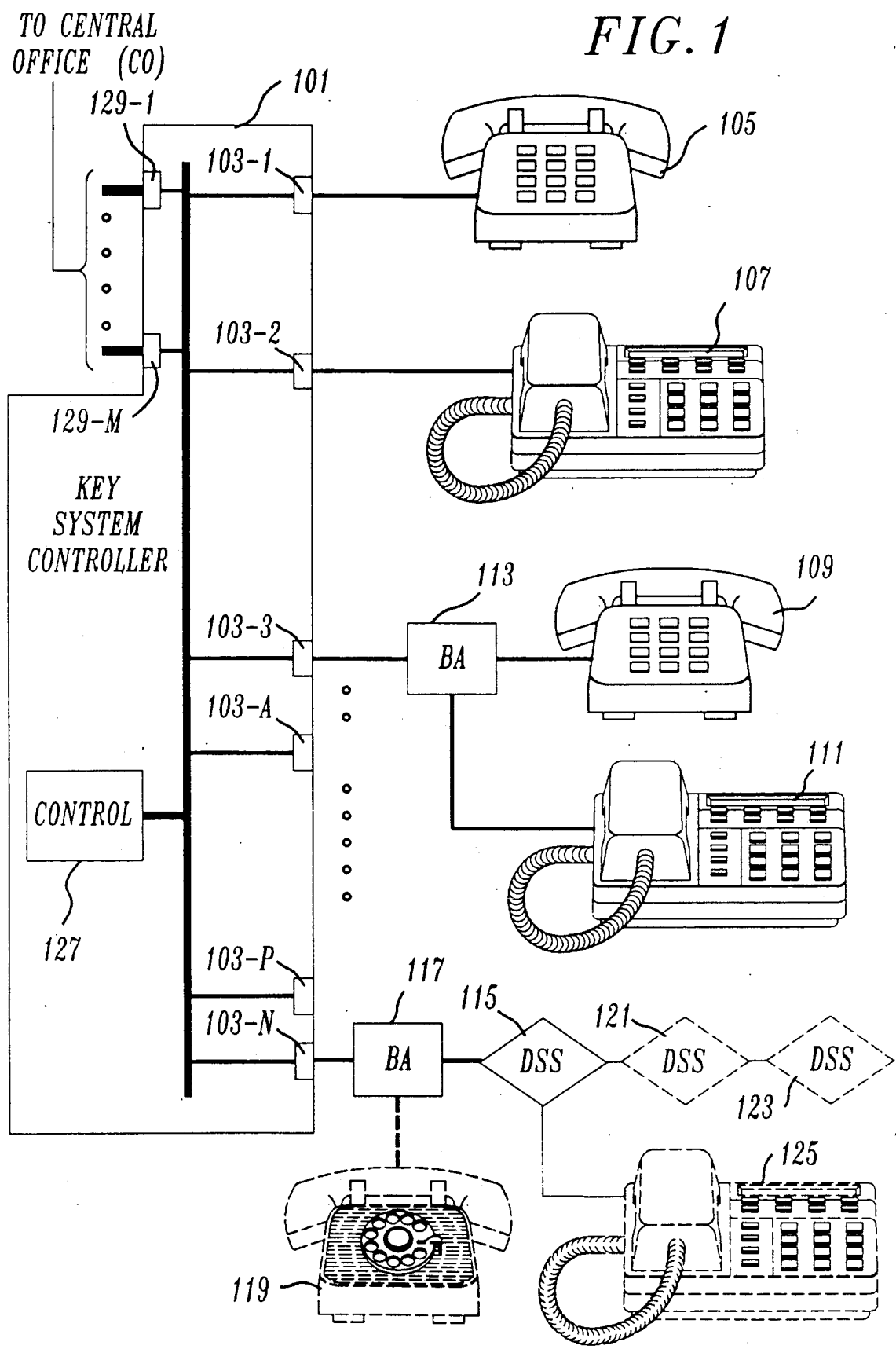
FIG. 1 depicts a key system controller embodying aspects of the invention.

FIG. 1 depicts key system controller 101 having station ports 103-1 to 103-N. Station ports 103 include aspects of the invention. Other station ports (not shown) that do not embody the invention are not precluded from being incorporated into key system controller 101. For purposes of this example, each of station ports 103 is functionally identical to any other of station ports 103. In a departure from the prior art and in accordance with an aspect of the invention, each of station ports 103 is capable of operating at least one compatible key set, at least one tip and ring device or at least a key type set and one or more tip and ring devices simultaneously bridged onto the same station port without the use of any special service circuits or adaptors to provide previously unavailable features to a user. One such key set interface having an interface compatible with station ports 103 is described in copending application U.S. patent application Ser. No. 546,323 filed concurrently herewith.

Several of station ports 103 of key system controller 101 are connected to station equipment in a manner illustrating aspects of the invention. Station port 103-1 of key system controller 101 is shown interfaced to TR device 105. Station port 103-2 of key system controller 101 is interfaced to key set 107. Also displayed, in accordance with an aspect of the invention, is key system controller 101 interfaced at station port 103-3 to TR device 109 and key set 111 via bridging adapter (BA) 113, which is a conventional telephone Y type jack. Nothing precludes bridging adaptor 113 from being directly incorporated into key system controller 101 or a key set. Bridging adaptor 113 is shown separately only for clarity purposes. Alternatively, bridging adaptor 113 could be eliminated and a direct parallel connection made between TR device 109 and key set 111. Button box 115, also known as a direct station select (DSS) unit which is an enhanced key interface unit, is shown being connected to and controlled by key system controller 101 at station port 103-N via optional bridging adaptor (BA) 117. If optional bridging adaptor 117 is employed, a TR device, e.g., tip and ring telephone 119, can also be bridged in parallel with button box 115. Also shown are optional button boxes 121 and 123 which are cascaded with button box 115. Additionally, shown is the attachment of optional key set 125 via button box 115. Within the scope of the present invention many other configurations of equipment combinations and station port assignments can be implemented.

Coordinating the overall operation of key system controller 101 is programmable control unit 127 which provides all the necessary control functions. These control functions include but are not limited to: responding to actions taken at a station set, setting up calls placed through key system controller 101, controlling the application of various tones and determining which station ports to alert and what method of alerting is to be used. Programmable control units for key systems are well known. They are typically microprocessor based.

Central office (CO) line ports 129-1 through 129-M provide an interface for key system 101 to a telephone central office for placing calls over the public switched telephone network. Such line ports are well known in the art. Indeed, other forms of external interfaces, of which central office (CO) line ports 129 are but one example, may be implemented, In a preferred embodiment of station port interface 200, shown in FIG. 2, each of station ports 103 (FIG. 1) of key system controller 101 utilizes at least four (4) conductors adapted for transferring power and communications to devices to be attached. Briefly, a first pair of conductors, TR-pair 201, is adapted to carry ringing signal, tip and ring loop power and voiceband communication. It is noted that all of these signals are not necessarily carried simultaneously. A second pair of conductors, service pair 203, is adapted to carry bi-directional supervisory and control signals. Operating power intended for non-TR devices, in this preferred embodiment, is also provided via service pair 203. Again, all of these signals are not necessarily carried simultaneously. Additionally, key system controller 101 regulates access to TR-pair 201 for voiceband communication purposes by a key set at any of station ports 103 through the use of special supervisory and control messages. These messages are supplied to transmit data input of 205 of data transceiver 207 and are ultimately transmitted to a key set over service pair 203. Other station port interface embodiments, such as a one pair implementation or a three pair implementation, are clearly within the scope of the present invention provided that they are capable of fully operating at least one key telephone set, at least one tip and ring device or at least a key type set and one or more tip and ring devices simultaneously bridged onto the same station port.

Figure 2:
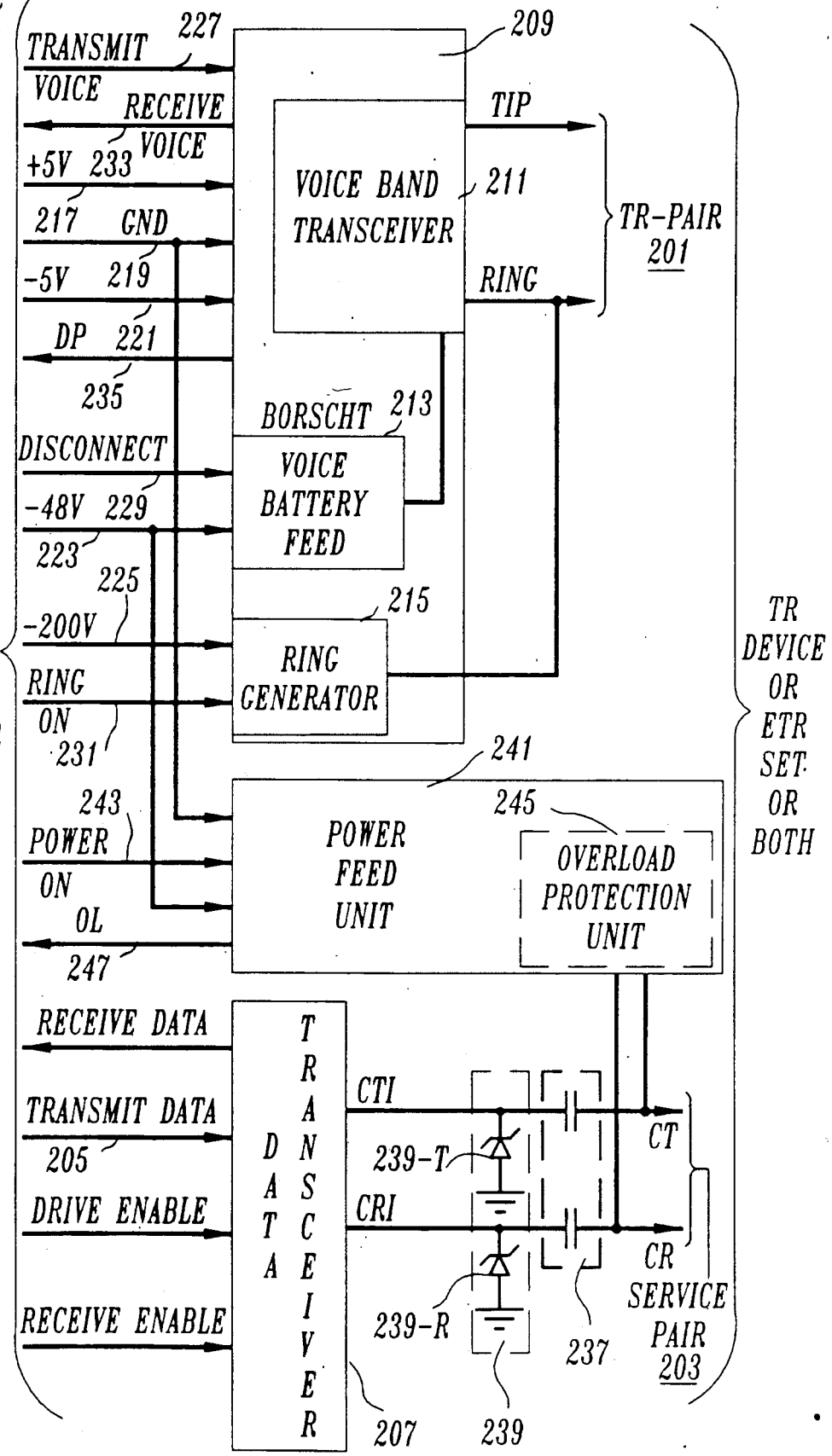
FIG. 2 shows an exemplary implementation of interface apparatus required in a station port of a key system controller for operating and controlling a tip and ring device, a key set or both simultaneously to operate over a two conductor pair connection.

More specifically, shown in FIG. 2 is battery feed, overvoltage protection, ringing signal sending, supervisory, codec, hybrid, and test (known in the art as BORSCHT) circuit 209 that provides and detects the tip and ring signals necessary to operate TR devices. The codec feature is not required for space division switches and the overvoltage protection and test features are optional. Shown in more detail as specifically being incorporated into BORSCHT circuit 209 are voice band transceiver 211, voice battery feed 213 and ring generator 215 which are controlled by key system controller 101 (FIG. 1). BORSCHT circuits are well known in the art. In this example, key system controller 101 supplies the operating power required by BORSCHT circuit 209. The operating power includes but is not limited to: +5 volts (lead 217), GROUND (lead 219), −5 volts (lead 221), −48 volts (lead 223) and −200 volts (lead 225). Voiceband signals to be transmitted to a station set are supplied to TRANSMIT VOICE input 227. Further, signal DISCONNECT, on lead 229 enables key system controller 101 (FIG. 1) to control the application and removal of loop current to and from TR-pair 201 by voice battery feed 213. This allows key system controller 101 to generate and supply a remote disconnect signal to a TR device. Application of ringing signal to TR-pair 201 at each of station ports 103 is individually controllably via RING ON signal 231 supplied by key system controller 101.

Voiceband communication, including multi-frequency signalling tones, transmitted from station sets attached to interface 200 are supplied by BORSCHT circuit 209 to key system controller 101 (FIG. 1) on RECEIVE VOICE output signal 233. Depending upon the state of the call at any of station ports 103 this signal may be switched in key system controller 101 to another one of station ports 103 or supplied to a multi-frequency tone detector for extracting the signalling information contained in the tone and decoding the button depression. Thus, TR-pair 201 is used both for alerting purposes at TR devices and for voiceband communications with key or tip and ring station sets.

BORSCHT circuit 209 provides the supervisory function at each of station ports 103 (FIG. 1) by supplying output signal DP on lead 235 to key system controller which indicates that an at least predetermined minimum loop current value is being drawn from BORSCHT circuit 209 by TR-pair 201. Each key set attached to interface 200 may draw a predetermined maximum loop current from TR-pair 201. An exemplary predetermined maximum current drawn by a key set is 7 mA. Similarly, a TR device attached to interface 200 draws no current in the on-hook state and may draw a predetermined minimum loop current from TR-pair 201 in the off-hook state. An exemplary predetermined minimum current drawn by a TR device in the off-hook state is 15 mA. TR devices draw more loop current than key sets that are completely compatible with interface 200. If the predetermined minimum current detected by interface 200 was set to be less than the predetermined maximum drawn by a key set, output signal DP on lead 235 would be falsely asserted when loop current was drawn by a key set. It is important that only the current drawn from TR-pair 201 by a TR device in its off-hook state is detected. The amount of current drawn from TR-pair 201 by a key set should not be detected. This is realized by asserting output signal DP on lead 35 only when the current drawn from TR-pair 201 is greater than the maximum current drawn by key sets bridged onto a single one of station ports 103. When an appropriate current value is chosen and implemented, in accordance with an aspect of the invention, key system controller 101 can detect tip and ring pulse signalling (switch-hook state and rotary dialing) by monitoring the status of output signal DP on lead 235. An exemplary current value is 10 mA.

Data transceivers 207 and capacitors 237 bi-directionally couple data from key system controller 101 (FIG. 1) to service pair 203. The data signaling arrangement used must match that employed by a corresponding data transceiver located in an attached remote key set for communication to take place. The data packets, in this example, are transmitted in a so called "ping-pong" fashion. Further, each data packet comprises 24 bits, wherein the first 16 bits are the actual information containing a supervisory and control message and the last 8 bits are a checksum computed in a predetermined fashion based upon the first 16 bits of information. Each 16 bit message can yield only one checksum. A data packet is valid when the 8 bit checksum it contains corresponds to the 16 bits of information therein. Each 16 bit pattern is predefined as a command, a status indication or other necessary information required to be transported between key system controller 101 and a key set for supporting implementation of enhanced functionality features. As an example, packet 0000000000010100010100 indicates that a key set should sound a predetermined alerting tone. The formation of such message sets is well known in the art. The data signals that are superimposed in this example conform to those disclosed in U.S. Pat. No. 4,454,383. Of course, utilization of any other signaling method that can be superimposed is not precluded. In accordance with an aspect of the invention, a predetermined subset of the supervisory and control messages are messages that signal alerting to a key set. Furthermore, at least the alerting message subset may be supplied from key system controller 101 through one of station ports 103 for transmission to a key set independent of the state of or signals appearing on TR-pair 201. Also, in accordance with an aspect of the invention, a subset of messages is reserved for regulating the transmission and reception of voiceband signals by a key set over TR-pair 201. Thus, for example, a first message would indicate to a key set that it should disable voiceband transmissions and a second message would indicate that the key set should enable voiceband communication transmission. Similarly, messages indicating enable and disable voiceband communication reception may be provided. Another group of messages could indicate that a key set should disassociate itself from TR-pair 201 with regard to voiceband communications by placing itself in a high impedance state.

Capacitors 237 block any DC power that is placed on service pair 203 from reaching data transceiver 207. Outbound supervisory and control messages from data transceiver 207 are passed through capacitors 237 which superimpose the messages onto the power that is present at CT and CR for transmission to a remote key set. Additionally, capacitors 237 pass supervisory and control messages inbound from a remote key set to data transceiver 207. Optional protection unit 239 protects data transceiver 207 from large voltage transients that may become present on CT and CR. In this example, protection unit 239 comprises zener diodes 214-T and 214-R configured to clamp any signal to their rated value.

Power feed unit 241 blocks the transmission of AC signals, i.e., the data signals containing the control and supervisory information, yet permits the passage of DC signals, i.e., operating power, outward over service pair 203 to a remote key set. The DC power is supplied to station ports 103 from key system controller 101 (FIG. 1), in this example, as −48 volts (on lead 223) and GROUND (on lead 219). In a preferred embodiment, power feed unit 241 contains transistor based constant current drivers, which are well known.

An additional feature of interface 200, in accordance with another aspect of the invention, is the ability to independently control, at each of station ports 103 (FIG. 1) of key system controller 101, the application and removal of the power supplied to a remote key set. In this example, control input POWER ON (on lead 243) of power feed unit 241 is used by key system controller 101 (FIG. 1) to control the actual feeding of power to service pair 203 by power feed unit 241. This power control provides a mechanism for controllably applying power to each of station ports 103 at start up to prevent the drawing of excessive start up power from key system controller 101. Also, the capability to control power application provides the ability to induce a key set to re-initialize itself as when power is first received by the key set. This capability is used to attempt to restart key sets that are not responding with valid messages in the expected manner. The cycling of power off and on for predetermined periods is typically detected by a power on reset unit located in a key set which generates a RESET indication that is supplied to a control circuit therein for restarting the key set.

Incorporated into power feed unit 241 is optional overload protection unit 245 which determines if an excessive amount of power is being drawn from the station port into which it is incorporated. If the drawing of an excessive amount of power is detected, optional overload protection unit 245 will automatically cause power feed unit 241 to cease supplying power to service pair 203. Power can then be reapplied after a predetermined time period has elapsed. Alternatively, output OL (on lead 247), may be supplied from interface 200 to key system controller 101 (FIG. 1) to indicate that an overload condition has occurred. Key system controller 101 can then reapply power through the use of input signal POWER ON (on lead 243). An excessive amount of power may be drawn, for example, under a short circuit condition.

The ability of station ports 103 in key system controller 101 comprising interface 200 to signal alerting independently via ringing signal supplied to TR-pair 201, via messages indicating alerting transmitted on service pair 203 for a key set or via both techniques simultaneously in addition to control by key system controller 101 of voiceband communication access by a key set at any of station ports 103 allows for incorporation of additional user features into key system controller 101. These new features are implemented in programmable control unit 127 of key system controller 101 for determining whether to signal alerting via ringing signal supplied to TR-pair 201 only, to signal alerting via messages indicating alerting transmitted on service pair 203 for a key set, via both techniques simultaneously or not to signal alerting at all. The decisions and determinations made by programmable control unit 127, as well as the interactions of the apparatus with the user via operations that have affect and are effected at the remote station sets, define the operation of each feature. It may be required that certain parameters and specifications for the operation of a feature be determined prior to use of a feature at a particular one of station ports 103. The new features include the following: ring specific applications relating to an external event; direct transfer of calls to the transferor station port; calling other sets on the same station port; MEWPRIC (Multiple Extension With Personal Ringing on Incoming Calls) operation, i.e., a party line type of operation where the TR device and the key set sharing a single station port of station ports 103 are assigned different endpoint addresses; prevention of "barge in", i.e., bridging, by a key type set onto a call to a TR device; time phasing of rings to allow for a coverage operation; and FAX trouble indication. It should be noted that when alerting at a key set is to be prevented or delayed the messages specifying audible alerting that would normally be transmitted are inhibited by key system controller 101. However, illuminated status indicators in the key telephone system may be, depending upon the implementor's desire, appropriately updated to reflect any type of alerting that is occurring at station ports 103.

In ring specific applications relating to an external event, a predetermined condition on an external interface of key system 101 (FIG. 1), e.g., central office (CO) line ports 129, is detected by key system controller 101, such as CNG (CalliNG) tone or a special central office ring pattern. Then, in response to the determination of the existence of the condition, a particular class of stations, e.g., only key sets, only TR devices or both key sets and TR devices, are alerted at one or a set of station ports 103. For example, if CNG tone is detected on central office (CO) line port 129-1 only those of station ports 103 that have been preprogrammed specifically for FAX service in response to a detection of CNG tone received on central office (CO) line port 129-1 will be alerted. Further, the only alerting at preprogrammed ones of station ports 103 will be only via ringing signal applied to TR-pair 201. CNG tone is a tone to indicate a calling non-speech device comprising a repeated 1100 Hz tone that is ON for 0.5 seconds and off for 3 seconds until an appropriate response is received or a time-out occurs. Alternatively, the detection of two short rings and one long ring on one of central office (CO) line ports 129 indicates that a call is destined for the boss of a boss-secretary team. If the boss and secretary are sharing one of station ports 103, the boss having a key set and the secretary having a tip and ring telephone set, only alerting messages over service pair 203 are transmitted. In another example, the detection on one of central office (CO) line ports 129 of standard ringing causes the transmission of both ringing signal and alerting messages.

Figure 3:
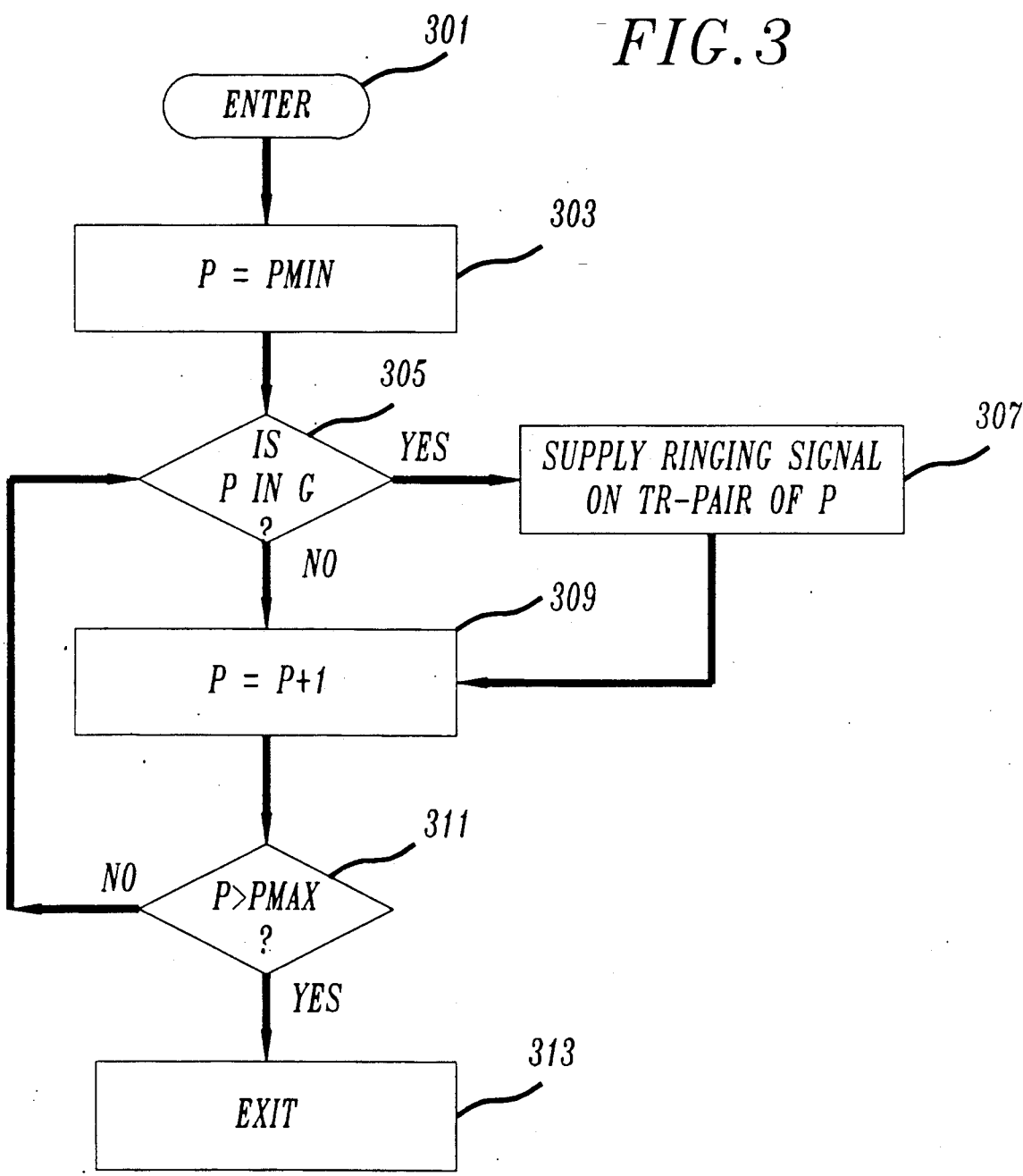
FIG. 3 displays, in flow chart form, an exemplary implementation of ring specific applications relating to an external event.

An exemplary implementation of this feature, illustrating the determination to ring only via tip and ring ringing signal in response to a detected external event, is depicted in flow chart form in FIG. 3. Prior to actual operation of the feature, key system controller 101 is programmed so that the several of station ports 103 that are responsive to a particular predetermined external event E are included in a group G. In this example, when an external event is detected key system controller 101 will alert only TR devices on those of station ports 103 that are included in group G. This is done by only signalling alerting via ringing signal supplied to TR-pair 201 (FIG. 2) of the selected station ports 103.

Accordingly, the routine is entered via step 301 upon detection of predetermined external event E. This detection could be hardware based, software based or a combination thereof, at the implementor's discretion. Thereafter, in step 303, a variable P is assigned the value of PMIN, the lowest station port address of station ports 103. Next, conditional branch point 305 tests if station port P is included in group G. If the test result in step 305 is YES, control is passed to step 307 signal alerting via ringing signal supplied to TR-pair 201 (FIG. 2) of station port P. Thereafter, control is passed to step 309. If the test result in step 305 is NO, control is passed directly to step 309. Step 309 increments P to point to the next sequential one of station ports 103. Thereafter, conditional branch point 311 tests if the value of P is greater than PMAX, the highest station port address of station ports 103. If the test result in step 311 is NO, control is passed back to step 305 to test the current station port P. If the test result in step 311 is YES, the routine is exited via step 313. Those skilled in the art will be able to construct other implementations such that station ports in another group are rung in another fashion, e.g., only alerting via messages to the key set in response to other events, without violating the scope or spirit of the invention.

Direct transfer of calls to the transferor station port is a novel extension of the well known key system transfer operation. In addition to regular transfers, calls may be transferred from a TR device at one of station ports 103 (FIG. 1) to another or the same TR device at that station port, only a key set at that station port or to both a key set and the TR devices at that station port. Alternatively, a call may be transferred from a key set to a TR device at that station port. This feature is useful for transferring calls to or from a FAX machine to facilitate reception or transfer of a FAX during a voice conversation. Another use of this feature would be to transfer a call between a boss and a secretary bridged onto one of station ports 103, as described above, for call screening purposes. Additionally, this technique could be used to transfer a call to a tip and ring telephone or key set in another part of a large room or a different room, yet limiting the total number of station ports 103 required.

A transfer to the transferor station port of station ports 103, is accomplished by a predetermined sequence of switch hook flashes and/or button depressions. For example, by initially activating the transfer feature through the pressing of the transfer button on a key set and dialing a predetermined code specifying the transfer type selected, i.e., a transfer to the transferor station port. A call being transferred to a key set can begin alerting via alerting messages transmitted over service pair 203 (FIG. 2) immediately upon completion of the transfer command. A call being transferred to a TR device should require that all TR devices bridged onto that station port of station ports 103 are on-hook before ringing signal is applied to protect the ears of the transferee from a loud popping noise that ringing signal can generate in the handset. If an on-hook condition is required, the detection of on-hook must be accomplished within a predetermined period of time or an error condition will result. Additionally, when a call is transferred to a TR device from a key set, key system controller 101 (FIG. 1) should, at the implementor's option, instruct the key set via messages on service pair 203 (FIG. 2) to disable its connection for voiceband communication purposes to TR-pair 201.

Figure 4:
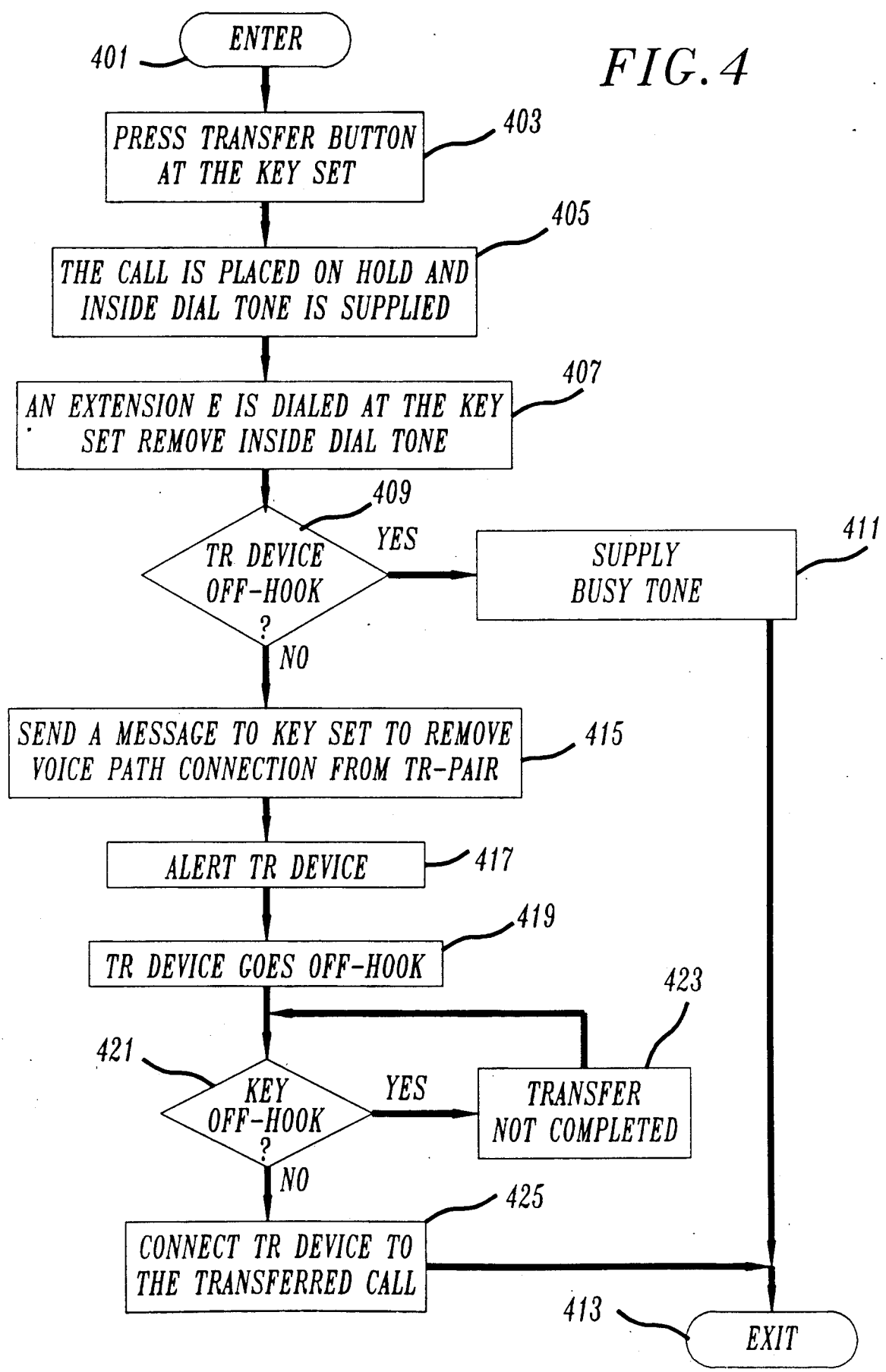
FIG. 4 shows, in flow chart form, an exemplary implementation of direct transfer of a call to the transferor station port.

FIG. 4 depicts, in flow chart form, an example of a direct transfer of a call from a key set on a station port directly to the TR device on that same station port. Prior to entry, a transferable call must be established though key system controller 101 (FIG. 1) to the transferring station port of station ports 103. Accordingly, the call transfer routine is entered via step 401. In step 403 a user presses the transfer button at a key set attached to one of station ports 103 (FIG. 1). Next, in step 405 key system controller 101 places the call on hold. Voiceband signals from the remote party are no longer supplied to TRANSMIT VOICE input 227 (FIG. 2) for voiceband transceiver 211 of BORSCHT circuit 209. Instead, "inside" dial tone (also known as system dial tone, to be distinguished from dial tone supplied from a central office) is supplied by key system controller 101 to TRANSMIT VOICE input 227 for transmission on TR-pair 201 (FIG. 2). The inside dial tone is heard by the user. In step 407 the user dials extension E from the key set. In this example, extension E must be the extension of TR devices attached to this transferring one of station ports 103. In the usual manner of telephone dialing, when the first digit of extension E is dialed the inside dial tone is removed (no longer supplied). Next, conditional branch point 409 tests if any TR devices attached to this transferring station port are off-hook. If the test result in step 409 is YES, control is passed to step 411 which causes a busy tone to be supplied to TRANSMIT VOICE input 227 for transmission on TR-pair 201 (FIG. 2). The busy tone is supplied in a manner similar to that described for the inside dial tone. Control then passes to step 413 and the routine is exited. If the test result in step 409 is NO, control is passed to step 415 which causes a message to be sent over service pair 203 (FIG. 2) directing the key set to remove its connection for voiceband communication from TR-pair 201 (FIG. 2). This is done so that ringing signal to be supplied in subsequent steps on TR-pair 201 (FIG. 2) is not audible at the key set. Also, subsequent voiceband transmissions from the key set will not interfere with the voiceband transmissions originating at the transferee TR device. Step 417 then alerts the TR device via ringing signal supplied to TR-pair 201 (FIG. 2). Next, control is passed to step 419 which retains control until the detection of an off-hook on TR-pair 201 (FIG. 2). Upon detection of an off-hook on TR-pair 201 (FIG. 2) control is passed to conditional branch point 421. Conditional branch point 421 tests if the key set attached to this station port and initiating this transfer is off-hook. If the test result in step 421 is YES, control is passed to step 423 which indicates that the transfer in not completed yet. Control is then passed back to step 421. If the test result in step 421 is NO, control is passed to step 425 which removes the transferred call from hold and reconnects the voiceband signals of the call to TRANSMIT VOICE input 227 (FIG. 2) and thus through voiceband transceiver 211 of BORSCHT circuit 209 to TR-pair 201 and the transferee TR device. The routine is then exited via step 413 and control is returned to the main key system program. In a similar manner, as will be apparent to one skilled in the art, other transfer mechanisms can be implemented. Additionally, transfer from TR devices to key sets or to other TR sets or a combination thereof can be arranged without violating the scope and spirit of the invention.

Figure 5:
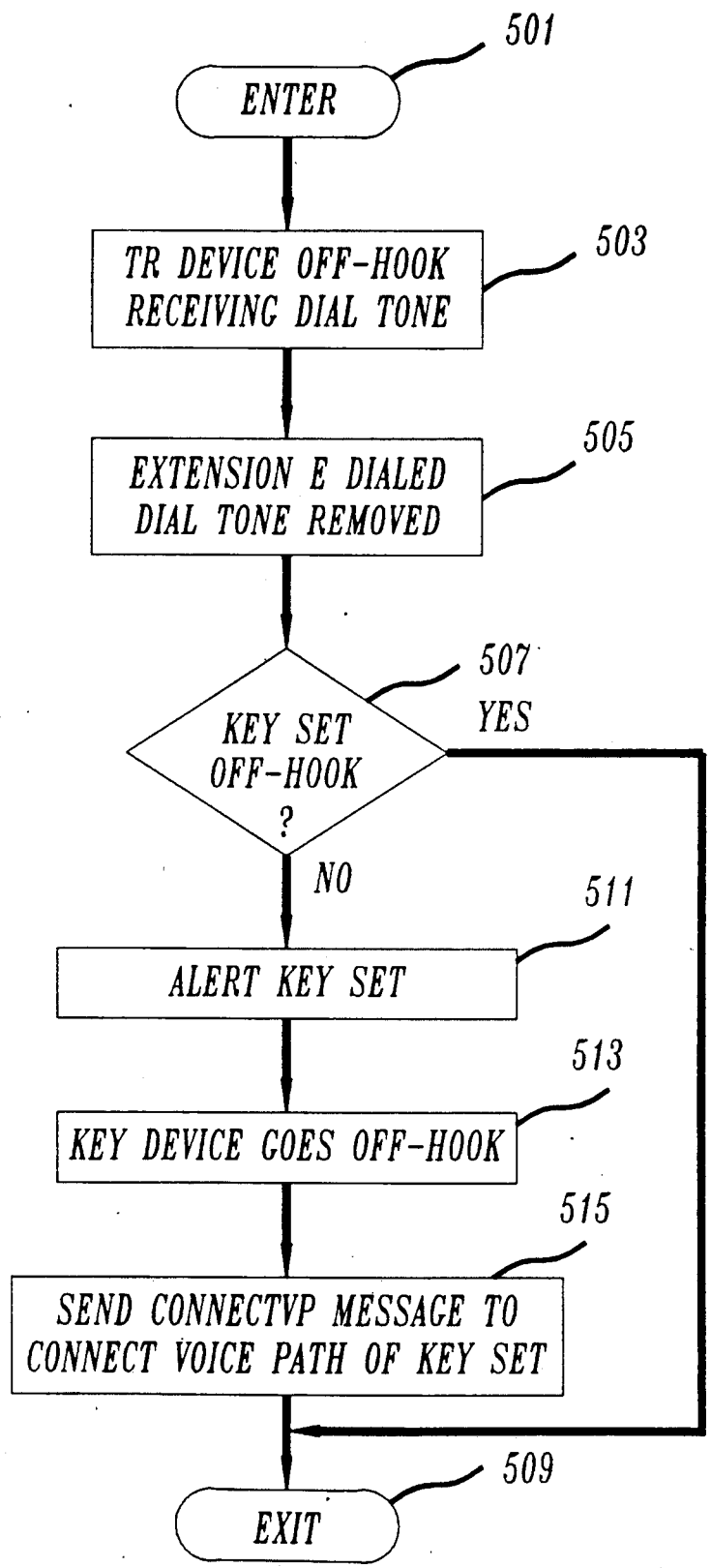
FIG. 5 depicts, in flow chart form, an exemplary implementation of placing a call to the calling station port.

Calling other sets on the same one of station ports 103 as the calling set is similar to direct transfer to the transferor station port except that there is no requirement to establish a transferable call though key system controller 101 (FIG. 1) prior to starting the routine. An example of placing a call via this method is shown in FIG. 5, in flow chart form. The exemplary call to be placed is a call from a TR device to a key set. Prior to entry, a TR device must go off-hook at a station port on which is also bridged a key set.

Accordingly, the routine is entered via step 501. Step 503 causes inside dial tone to be supplied to TR-pair 201 (FIG. 2). The user at the off-hook TR device can hear the inside dial tone. In step 505, the user dials extension E from the TR device. In this example, extension E must be the extension of a key set attached to this station port. In the usual manner of telephone dialing, when the first digit of extension E is dialed the inside dial tone is removed (no longer supplied). Next, conditional branch point 507 tests if the key set attached to this station port is off-hook. If the test result in step 507 is YES, control is passed to step 509 which exits the routine. If the key set was granted access to voiceband communications on TR-pair 201 (FIG. 2) at the time it went off-hook, communication can take place between the TR device and the key set. If the test result in step 507 is NO, control is passed to step 511 which alerts the key set by supplying appropriate alerting messages on service pair 203 (FIG. 2). Control is then passed to step 513 which retains control until the key set goes off-hook. When the key set goes off-hook control is passed to step 515 which sends a CONNECTVP message to the key set over service pair 203 (FIG. 2) instructing the key set to enable access for voiceband communications over TR-pair 201 (FIG. 2). Voiceband communication can now take place between the TR device and the key set. The routine is then exited via step 509.

In an alternate implementation, the feature could employ a feature activation code, which, when entered by the user, would automatically begin alerting at any other sets attached to the same one of station ports 103 (provided that all TR devices are on-hook or go on-hook within a predetermined period of time.)

The ability to separately or simultaneously alert TR devices and key sets enables the assignment of a separate endpoint address at each station port of station ports 103 for the TR devices, the key sets or a combined address. Use of this multiple assignment arrangement is known as MEWPRIC (noted above) operation. This allows one to make a call to a particular set class (key, TR, or any set) on each of station ports 103. A caller from another one of station ports 103 could place a call to only the TR devices on the destination station port of station ports 103 by specifying during dialing the endpoint address of TR devices at the destination station port. Thus, for example, any station port of station ports 103 in the system could place a call directly to a FAX machine, the lone TR device at that station port, even if a key set is bridged on. Alternatively, a caller from one of station ports 103 could place a call only to a key set on the destination station port by specifying during dialing the endpoint address of the key set at the destination station port. In another scenario, a caller from another station port of station ports 103 could place a call to any unit attached to the destination station port by specifying an endpoint address that includes both the TR device and the key set, i.e., it causes alerting on both TR-pair 201 (FIG. 2) and on service pair 203. Another variation that combines direct inward system access, DISA, (a feature well known in the art) with the MEWPRIC operation allows outside callers to specify the particular device type they wished to reach at their selected particular station port of station ports 103, if they know the correct endpoint address.

Figure 6:
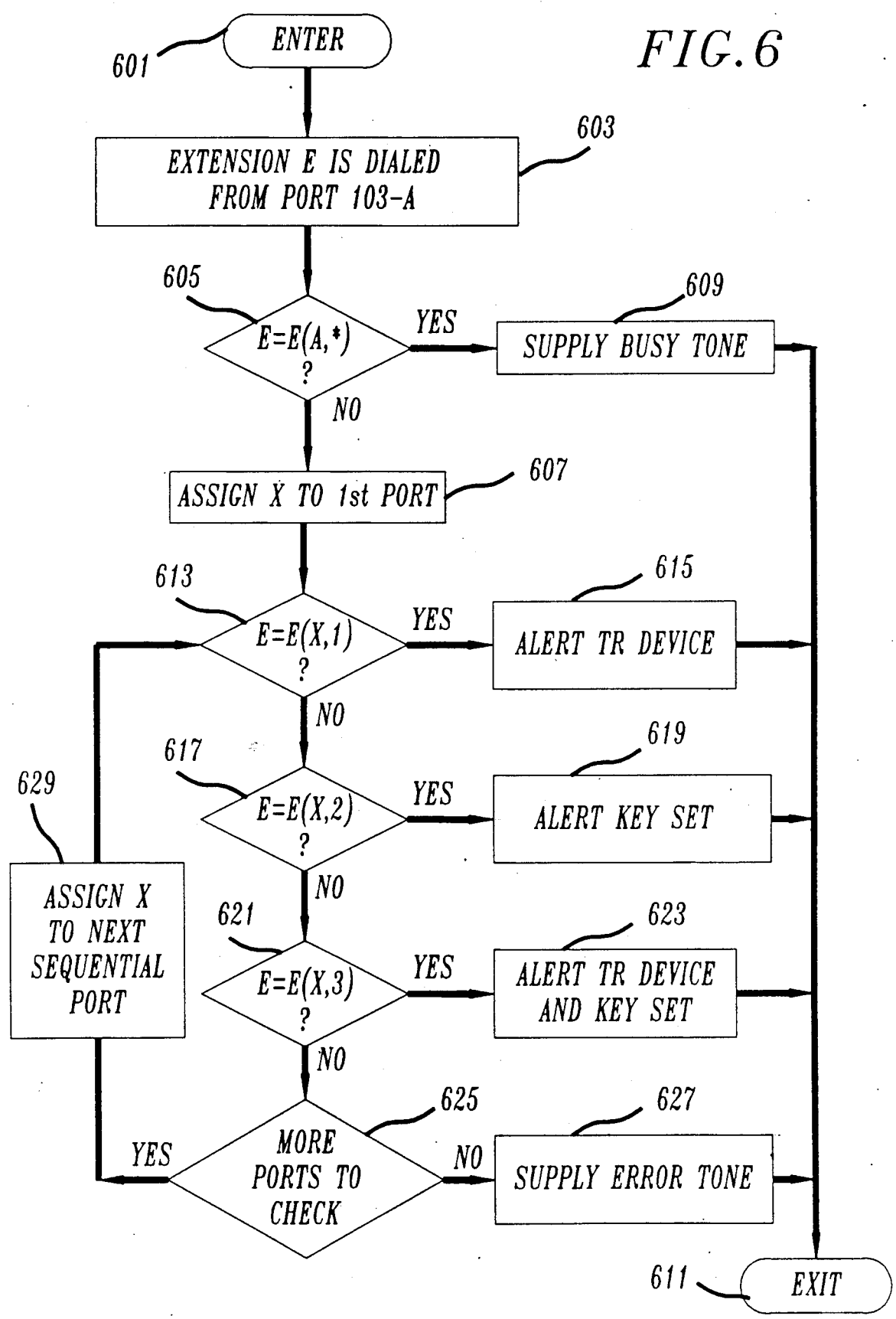
FIG. 6 illustrates an exemplary implementation of MEWPRIC operation, in flow chart form.

In an exemplary implementation of the MEWPRIC operation, shown in flowchart form in FIG. 6, each of station ports 103 (FIG. 1) is assigned three (3) predetermined telephone extension numbers represented in functional form as $E(X,Z)$. X is a variable that can assume values that correspond to the number of one of station ports 103, i.e., a value from 1 to N. Thus, station port 103-X, at any particular instant in time, is whichever of station ports 103 the number of which corresponds to the value of X at that instant. Z is also a variable and indicates the type of alerting to be supplied. A value for Z of 1 corresponds to a TR devices only, a value of 2 to a key set only and a value of 3 to any set (both TR devices and key sets). A mapping function, determined by the implementor, derives either the values of X and Z when given an extension $E(X,Z)$ or the value of extension $E(X,Z)$ when supplied with values of X and Z. One example of such a mapping would be implemented via a look-up table. Mapping functions and implementations thereof are well known. Referring to FIG. 6, the routine is entered via step 601 upon the detection of an off-hook at one of station ports 103, in this example, station port 103-A (FIG. 1). In step 603 the user at station port 103-A dials an extension with a value of E. (A) is a constant and corresponds to the number of the one of station ports 103 from which the user is calling. Next, conditional branch point 605 tests if $E=E(A,*)$ where * signifies any value of a variable that will allow the equality to be true is acceptable to satisfy the test. If the test result in step 605 is YES, control is passed to step 609 which supplies a busy tone to TR-pair 201 (FIG. 2) of station port 103-A. The routine is then exited via step 611. If the test result in step 607 is NO, control is passed to step 607 in which variable X is assigned to a value corresponding to the number of the first station port in the system. Control is then passed to conditional branch point 613 which tests to determine if the value of E is equal to $E(X,1)$. If the test result in step 613 is YES, control is passed to step 615 which alerts the station port of ports 103 corresponding to X, i.e., port 103-X, by causing ringing signal to be supplied to TR-pair 201 (FIG. 2) of that station port. The routine is then exited via step 611. If the test result in step 613 is NO, control is passed to conditional branch point 617 which tests if the value of E is equal to $E(X,2)$. If the test result in step 617 is YES, control is passed to step 619 which alerts station port X by causing alerting messages to be supplied to service pair 203 (FIG. 2) of port 103-X. The routine is then exited via step 611. If the test result in step 617 is NO, control is passed to conditional branch point 621 which tests if the value of E is equal to $E(X,3)$. If the test result in step 621 is YES, control is passed to step 623 which alerts station port X by causing ringing signal to be supplied to TR-pair 201 (FIG. 2) of station port 103-X and by causing alerting messages to be supplied to service pair 203 (FIG. 2) of station port 103-X. The routine is then exited via step 611. If the test result in step 621 is NO, control is passed to step 625 which tests if there are any further station ports to test. If the test result in step 625 is NO, control is passed to step 627 which causes an error tone to be supplied on TR-pair 201 (FIG. 2) and heard by the user at station port 103-A. The routine is then exited via step 611. If the test result in step 625 is YES, control is passed to step 629 which assigns to X the value of the next sequential one of station ports 103. Control is then passed back to conditional branch point 613.

The use of messages from key system controller 101 that regulate key set access to voiceband communication on TR-pair 201 (FIG. 2) can be used to prevent "barge in" by a key set onto a conversation already in progress with a TR device. One method of using this feature is to activate it on a call by call basis, either prior to or during the call. Alternatively, the feature could be programmed to be constantly active at a station port. One use for this feature would be to prevent a user from corrupting a facsimile transmission by going off-hook on a key set bridged with a FAX machine. In addition to preventing transmission by the key set, reception by the key set can also be inhibited to provide privacy and prevent eavesdropping.

Figure 7:
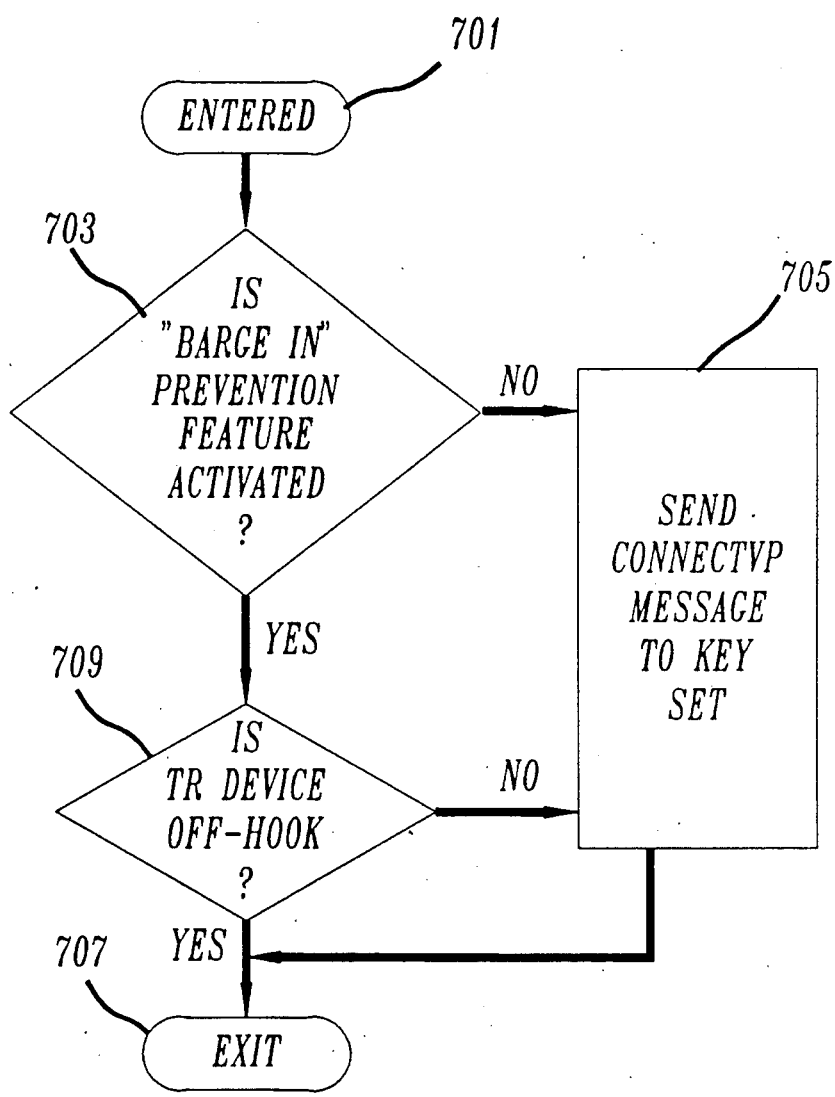
FIG. 7 shows, in flow chart form, an implementation of "barge in" prevention.

An exemplary implementation of "barge in" prevention is shown in flow chart form in FIG. 7. The station port or set of station ports 103 for which "barge in" prevention is to be activated must be predesignated as a station port at which this feature may be activated prior to actual activation of the feature. This predesignation may be performed by user custom programming, administration or may be predetermined and supplied in a default manner. The feature is activated by a detection of an off-hook message supplied from a key set at one of station ports 103 and the routine is accordingly entered at step 701. Thereafter, conditional branch point 703 tests if the barge in feature is activated on this station port. If the test result in step 703 is NO, control is passed to step 705 which sends a CONNECTVP message to the key set. A CONNECTVP message instructs the key set to enable access for voiceband communications over TR-pair 201 (FIG. 2). The routine is then exited via step 707. If the test result in step 703 is YES, control is passed to conditional branch point 709 which tests if a TR device is off-hook at this station port. If the test result in step 709 is NO, control is again passed to step 705 which sends a CONNECTVP message to the key set and the routine is exited via step 707. If the test result in step 709 is YES, the routine is exited via step 707 and a CONNECTVP message is not sent to the key set. Thus, the key set remains disconnected from TR-pair 201 (FIG. 2) so that voiceband communication cannot take place with the key set.

Another novel feature incorporated into programmable control unit 127 is the ability to preprogram a delay in alerting on either TR-pair 201 (FIG. 2) or on service pair 203 or to delay both. When both are delayed the same amount of time, the result is a conventional delayed ring feature. It may be desirable to delay ringing on TR-pair 201 (FIG. 2) so that a person would be more likely to answer the call at a key set. If no one was available to answer the call, after a predetermined number of rings the tip and ring lead would begin to alert with ringing signal and an answering machine could answer the call and take a message. Alternatively, a call screening system could be set up for a boss-secretary arrangement bridged onto one of station ports 103. Calls are programmed to ring immediately at the TR device which would be the secretary's telephone. Delayed ringing is programmed for the key telephone belonging to the boss. An incoming call would normally ring at and be answered by the secretary so as to be screened without disturbing the boss. If the secretary was away from his/her desk, after a predetermined delay, the call would alert at the boss' desk so that he/she could answer it.

Figure 8:
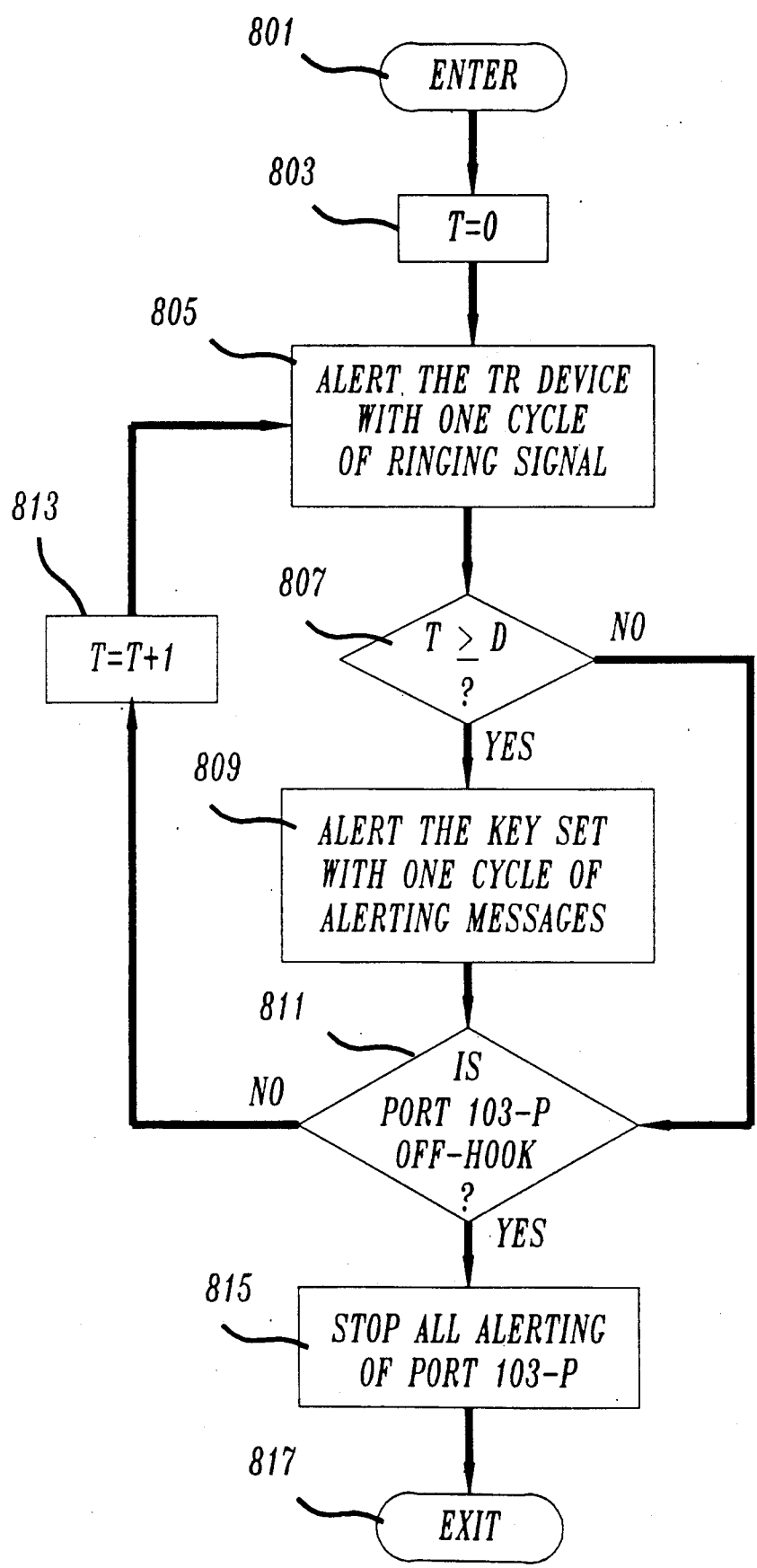
FIG. 8 is a flow chart form expression of a specific embodiment of time delaying of alerting via messages with respect to alerting via ringing signal.

FIG. 8 shows, in flow chart form, an exemplary implementation of delayed ringing at a key set only. Prior to activation of this feature at one of station ports 103, the station port on which it is to be activated must be designated as a station port at which this feature is to be invoked. Again, this designation may be performed by user custom programming, administration or the designations may be predetermined and supplied in a default manner. Additionally, D, the delay time in units of number of ring cycles that ringing is to be delayed by at the key set, must be preprogrammed. This feature is activated when a called is placed to a particular one of station ports 103, in this example station port 103-P, for which a designation and programming has been entered. Accordingly the routine is entered via step 801. In step 803, the number of ring cycles that ringing has already been delayed, T, is initialized to zero(0). Next, any TR devices at station port 103-P are alerted by the supplying of one cycle of ringing signal to TR-pair 201 (FIG. 2) of station port 103-P in step 805. Thereafter, conditional branch point 807 tests if T is greater than or equal to D. If the test result in step 807 is YES, control is passed to step 809 which alerts the key set with one cycle of alerting messages. Control then passes to conditional branch point 811. If the test result in step 807 is NO, control is passed directly to conditional branch point 811. Conditional branch point 811 tests if station port 103-P is indicating an off-hook, either by a TR device or a key set. If the test result in step 811 is NO, control is passed to step 813 which increments T and passes control back to step 805 to implement another alert cycle. If the test result in step 811 is YES, control is passed to step 815 which stops all alerting at station port 103-P. The routine is then exited via step 817.

FAX trouble indication is another new feature that is incorporated into programmable control unit 127. One of station ports 103 is preprogrammed as a FAX station port. Calls to the FAX station port must be answered by the indication of an off-hook signal on TR-pair 201 (FIG. 2). If the call is not answered by the indication of an off-hook signal on TR-pair 201 (FIG. 2) an indication, illuminated, audible or both, is given at a preprogrammed station or set of stations. For example, an LED on a key set bridged onto the same one of station ports 103 as the FAX machine would be illuminated. Alternatively, if an on-hook is expected within a specified predetermined time at a preprogrammed one of station ports 103 in response to a predetermined condition, e.g., a far end disconnect, then an audible tone is provided at one station port of station ports 103 designated for an attendant.

Shown in FIG. 9, in flow chart form, is an exemplary implementation of FAX trouble indication. Again, the ones of station ports 103 for which the feature is to be activated must be predesignated. Also, a station port at which the trouble indication is to be given must be predesignated. The routine is entered in step 901 when a call is placed to a station port predesignated for FAX trouble indication. In step 903, the number of ring cycles that have elapsed, R, is set to zero(0). One cycle of alerting via ringing signal supplied to TR-pair 201 (FIG. 2) is performed in step 905. Next, conditional branch point 909 tests if a TR device has gone off-hook at the station port. If the test result in step 909 is YES, control is passed to step 911 which stops all alerting at the station port. The routine is then exited via step 913. If the test result in step 909 is NO control is passed to conditional branch point 915 which tests if the number of ring cycles R that has elapsed is greater then RMAX, the maximum allowable ringing cycles before trouble is indicated. If the test result in step 915 is NO, control is passed to step 917 which increments N and passes control back to step 905 to provide further alerting. If the test result in step 915 is YES, control is passed to step 919 which provides a FAX trouble indication at the predesignated one of station ports 103 by illuminating a predetermined indicator or providing an audible signal. The routine is then exited via step 913.

We claim:

1. Apparatus in at least one station port interface of a switching system control unit adapted for controlling a plurality of remote station units over an at least one conductor pair comprising:

means for supplying all signals required to operate and control an at least one TR device regardless of whether a key set is also bridged onto said station port; and means for supplying directly all signals required to operate and control at least one key set regardless of whether a TR device is also bridged onto said station port.

2. The apparatus as defined in claim 1 wherein said means for supplying all signals to operate a TR device and said means for supplying all signals to operate a key set controllably supply said signals independently and simultaneously such that said station port can at least alert said at least one TR device and said at least one key independently, simultaneously or not at all.

3. The apparatus as defined in claim 1 further including means adapted for sending and receiving voice band communication over said first conductor pair.

4. The apparatus as defined in claim 1 wherein said means for supplying includes means adapted for supplying tip and ring ringing signal to said first conductor pair.

5. The apparatus as defined in claim 1 wherein said means for supplying includes means adapted for providing tip and ring loop power to said first conductor pair.

6. The apparatus as defined in claim 1 wherein said means for supplying includes means adapted for sending and receiving supervisory and control signals to an at least second conductor pair.

7. The apparatus as defined in claim 1 further including means for simultaneously receiving all signals transmitted to said switching system control unit by said at least one TR device and said at least one key set.

8. The apparatus as defined in claim 1 further including means for controllably applying and removing power intended for use by a key set to an at least second conductor pair.

9. The apparatus as defined in claim 1 wherein said switching system control unit further includes means for determining whether to alert at least said station port only via supplying ringing signal, only via supplying alerting messages, via supplying both ringing signal and via supplying alerting messages simultaneously on said station port or not to alert at said station port at all.

10. The apparatus as defined in claim 7 wherein said means for receiving includes means for detecting a flow of an at least predetermined amount of loop current to said first conductor pair.

11. The apparatus as defined in claim 8 wherein said means for controllably applying is responsive to reception of valid supervisory and control signals supplied from said at least second conductor pair for supplying and removing said power.

12. The apparatus as defined in claim 8 wherein said means for applying is responsive to the amount of said power being drawn wherein said power is removed if a predetemined threshold amount is exceeded.

13. The apparatus as defined in claim 12 wherein said power is reapplied after a predetermined amount of time has elapsed.

14. The apparatus as defined in claim 9 wherein said means for determining is responsive to detected predetermined external events.

15. The apparatus as defined in claim 9 wherein said means for determining is responsive to call transfer mechanisms of said switching system control unit for transferring an already established call at a station port directly back to said station port.

16. The apparatus as defined in claim 9 wherein said means for determining is responsive to call placement mechanisms of said switching system control unit for placing a new call from a calling station port directly to said calling station port.

17. The apparatus as defined in claim 9 wherein said means for determining is responsive to a particular endpoint address specified for a called station port, said endpoint address being a member of a set of endpoint addresses identifying said station port, such that each particular endpoint address of said set encodes a particular type of alerting to be generated and supplied to said station port.

18. The apparatus as defined in claim 9 wherein said means for determining is responsive to a predetermined selection for a particular station port for establishing a delay in commencing alerting via ringing signal relative to commencing alerting via alerting messages or for establishing a delay in commencing alerting via alerting messages relative to commencing alerting via ringing signal.

19. The apparatus as defined in claim 18 wherein said means for determining is further responsive to a predetermined selection of a duration for said delay.

20. The apparatus as defined in claim 9 wherein said means for determining is further responsive to a predesignation that a particular station port will only alert in response to a call that alerts at said station port with only a single predetermined alert type and wherein said switching system control unit includes further means for providing an indication that a call placed to said station port is not answered by a station set of a type capable of responding to said single predetermined alert type within a predetermined period of time.

21. The apparatus as defined in claim 9 wherein said means for supplying all signals to operate a TR device and for supplying all signaling to operate a key set are responsive to said means for determining.

22. The apparatus as defined in claim 3 further including means for generating and supplying to a key set bridged onto said station port a message for causing said key set to disable and voiceband transmission capabilities within said key set from said at least first pair.

23. The apparatus as defined in claim 3 further including means for generating and supplying to a key set bridged onto said station port a message for causing said key set to disable any voiceband receivers within said key set from said at least first pair.

* * * * *